United States Patent
Zheleva

(10) Patent No.: US 9,485,269 B2
(45) Date of Patent: Nov. 1, 2016

(54) SYSTEMS AND METHODS FOR REPORTER-BASED FILTERING OF ELECTRONIC COMMUNICATIONS AND MESSAGES

(71) Applicant: AOL Inc., Dulles, VA (US)

(72) Inventor: Elena Zheleva, Washington, DC (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 15/146,003

(22) Filed: May 4, 2016

(65) Prior Publication Data

US 2016/0248802 A1     Aug. 25, 2016

Related U.S. Application Data

(60) Continuation of application No. 14/474,282, filed on Sep. 1, 2014, now Pat. No. 9,355,245, which is a division of application No. 12/458,076, filed on Jun. 30, 2009, now Pat. No. 8,825,769.

(60) Provisional application No. 61/129,494, filed on Jun. 30, 2008.

(51) Int. Cl.
*H04L 29/06* (2006.01)
*G06N 99/00* (2010.01)
*G06N 7/00* (2006.01)

(52) U.S. Cl.
CPC ........... *H04L 63/1433* (2013.01); *G06N 7/005* (2013.01); *G06N 99/005* (2013.01)

(58) Field of Classification Search
None
See application file for complete search history.

(56) References Cited

U.S. PATENT DOCUMENTS

| | | |
|---|---|---|
| 2002/0199095 A1 | 12/2002 | Bandini et al. |
| 2003/0172291 A1 | 9/2003 | Judge et al. |
| 2004/0139165 A1 | 7/2004 | McMillan et al. |
| 2005/0080856 A1* | 4/2005 | Kirsch ................. H04L 12/58 709/206 |
| 2005/0114452 A1* | 5/2005 | Prakash ................. H04L 51/12 709/206 |
| 2006/0031483 A1 | 2/2006 | Lund et al. |
| 2006/0149821 A1 | 7/2006 | Rajan et al. |
| 2006/0212931 A1* | 9/2006 | Shull ..................... G06F 21/55 726/10 |
| 2007/0027992 A1* | 2/2007 | Judge .................. G06Q 10/107 709/227 |
| 2007/0143629 A1 | 6/2007 | Hardjono et al. |
| 2007/0208856 A1 | 9/2007 | Rounthwaite et al. |
| 2009/0132689 A1* | 5/2009 | Zaltzman ............... G06Q 10/00 709/223 |
| 2009/0282112 A1* | 11/2009 | Prakash ............... G06Q 10/107 709/206 |

(Continued)

OTHER PUBLICATIONS

PCT International Search Report and Written Opinion, mailed Sep. 16, 2009, in corresponding International Application No. PCT/US2009/049258.

(Continued)

*Primary Examiner* — Natisha Cox
(74) *Attorney, Agent, or Firm* — Finnegan, Henderson, Farabow, Garrett & Dunner LLP

(57) ABSTRACT

Methods and apparatuses for filtering electronic communications in a communication system. The method includes receiving a message report from a user in response to an electronic message received by the user, and identifying a confidence value associated with the user from whom the message report is received. The method also includes adding, if the confidence value exceeds a predetermined confidence value threshold, the confidence value to a signature value associated with the electronic message, and determining if the signature value exceeds a signature value threshold. The method further includes filtering the electronic message if the signature value exceeds the signature value threshold.

20 Claims, 4 Drawing Sheets

(56) References Cited

U.S. PATENT DOCUMENTS

2010/0115040 A1* 5/2010 Sargent ............... G06Q 10/10 709/206
2012/0030293 A1* 2/2012 Bobotek ............... G06Q 10/10 709/206

OTHER PUBLICATIONS

V. V. Prakash et al., "A Reputation-Based Approach for Efficient Filtration of Spam," Apr. 30, 2007, XP002543863 INET (12 pages), retrieved from the internet on Sep. 1, 2009, from http://www.cloudmark.com/releases/docs/wp_reputation_filtration_10640406.pdf.

"Another big change for viral app marketing on Facebook: Invitation limits now dynamic," http://www.insidefacebook.com/2008/02/13/, Feb. 13, 2008 (3 pages).

"Facebook Adopts Reputation Based Spam Filtering," http://avc.blogs.com/a_vc/2009/02/facebook-adopts.html, printed on Jul. 30, 2008 (2 pages).

Matt Blumberg, "Sender Score: Credit Scores for Emailers," http://onlyonce.blogs.com/onlyonce/2005/06/sender_score_cr.html, Jun. 23, 2005, printed on Jul. 30, 2008 (4 pages).

"BorderWare claim: Amazing Reputation Filtering (RSA)," http://richi.co.uk/blog/2008/04/borderware-claim-amazing-reputation.html, Apr. 9, 2008, printed on Jul. 30, 2008 (3 pages).

* cited by examiner

SYSTEMS AND METHODS FOR REPORTER-BASED FILTERING OF ELECTRONIC COMMUNICATIONS AND MESSAGES

CROSS-REFERENCE TO RELATED APPLICATION(S)

This application is a continuation of and claims the benefit of priority of U.S. patent application Ser. No. 14/474,282, filed Sep. 1, 2014 (now allowed), which is a divisional of U.S. patent application Ser. No. 12/458,076, filed on Jun. 30, 2009 (now U.S. Pat. No. 8,825,769), which claims the benefit of priority of U.S. Provisional Application No. 61/129,494, filed Jun. 30, 2008. The disclosures of the above-referenced applications are expressly incorporated herein by reference to their entireties.

TECHNICAL FIELD

The present disclosure relates generally to systems and methods for filtering of electronic communications and messages and, more particularly, to systems and methods for reporter-based filtering of electronic messages.

BACKGROUND

Email spam is a growing problem for the Internet community. Spam interferes with valid email, and it burdens both email users and email service providers (ESPs). Not only is it a source of annoyance, it also adversely affects productivity and translates to significant monetary costs for the email industry (e.g., reduced bandwidth, increased storage requirements, and the cost of supporting filtering infrastructures). Also, for some categories of spam, such as phish scams, the financial costs for users may be even greater due to fraud and theft.

Generally, spam-filtering techniques can be divided into three broad categories: spam-filtering based on sender-based reputation, spam-filtering based on email-header analysis, and spam-filtering based on an analysis of message content. In the first category, a sender-based reputation framework, senders are classified as either "spammers" or "good senders," based on criteria such as the sender's identity, the sender's domain, or the sender's IP address. The second category, email-header spam filtering, is based on detecting forgery in the email header and distinguishing the forgery from malformatting and other legitimate explanations, such as those resulting from forwarding activity.

The third category, analysis of message content, has been of particular interest to the machine learning community. Machine learning environments using a classifier, and which apply spam detection, use both batch-mode and online update models. Training a classifier in batch mode allows the use of a wide range of algorithms and optimization of performance over a large quantity of training data. Conversely, unless the classifier is frequently retrained, the system may quickly fall prey to adversarial attacks. Online learning approaches, on the other hand, allow for immediate incorporation of user feedback into the filtering function, but tend to be more difficult to tune, and the number of efficient algorithms is limited. In either approach, changes to the classification function may require a significant number of new examples, especially if the amount of data used to derive the current models was already very large. The diversity of messages within a spam campaign may be too low to effectively adjust the filtering function quickly enough. It is therefore convenient to consider augmenting the operation of a conventional spam filter with one that tracks high-volume spam campaigns and attempts to eliminate those mailings only.

Another problem in automating spam classification is the lack of a consensus definition for spam. What some people consider spam may be considered solicited mail by others. Some email-service providers allow users to mark emails they consider spam and report them to their ESP. In some cases, users can also report opposite errors, i.e., when legitimate email is mistakenly classified as spam. However, because user reports rely upon personalized definitions of spam, the cost of a large ESP to incorporate each individual's judgments into the filtering system may outweigh the benefits. Nevertheless, spam reports provided by users, as well as other forms of data acquisition have been used to build and validate spam detection systems.

Of particular interest is the use of such data to track spam campaigns sent in volume over defined periods of time, with a spam campaign assumed to consist of highly similar and often near-duplicate messages. In that context, when many users report nearly identical emails as spam, one can reasonably label a campaign as spam based on the volume of user reports received. A key requirement to the success of such a scheme is the ability to identify emails belonging to the same campaign, despite small or irrelevant differences (some tactically inserted by the spammer to complicate detection). The problem can be otherwise described as near-duplicate message detection, which has received considerable attention in the field of information retrieval, and as near-replica (and sometimes exact-replica) message detection in the email domain.

In summary, a duplicate-based spam detector decomposes each message into one or more fingerprints or signatures, and uses them for indexing, as well as for computing message similarity. Operationally, a few signature-based hash-table lookups are used to determine whether highly similar messages have been labeled spam and to act on an incoming message accordingly (i.e., signature-based deduplication). Fingerprinting algorithms differ in the attributes they use for signature computation (e.g., direct message content, message blocks, and subsets of text features), and the number of signatures per message (i.e., number of different fingerprinting algorithms applied). Using message signatures, clustering techniques can be used to verify cluster membership. That is, once a cluster signature becomes known (e.g., via user reports), it is easy to determine whether an arbitrary message falls into the same cluster. Signature-based deduplication is a form of clustering in which the stream of all incoming emails is clustered to identify high-density spikes in the content distribution, which are likely to correspond to spam campaigns.

The prior art methods may not adequately reduce the response time of spam filtering systems by recognizing a spam campaign at an earlier stage, and may not adequately incorporate user feedback. Moreover, the prior art methods may not perform automatic maintenance of a reliable user set. Therefore, the prior art systems may not satisfactorily reduce the costs that users and systems incur.

The disclosed embodiments are directed to overcoming one or more of the problems set forth above.

SUMMARY OF THE INVENTION

In one exemplary embodiment, the present disclosure is directed to a computer-implemented method for filtering electronic messages, comprising: receiving, by a processor, a message report from a user in response to an electronic message received by the user; identifying, by the processor, a confidence value associated with the user from whom the message report is received; adding, by the processor, if the confidence value exceeds a predetermined confidence value threshold, the confidence value to a signature value associated with the electronic message; determining, by the processor, if the signature value exceeds a signature value threshold; and filtering the electronic message if the signature value exceeds the signature value threshold.

In another exemplary embodiment, the present disclosure is directed to a system for filtering electronic messages, the system comprising: at least one memory to store data and instructions; and at least one processor configured to access the at least one memory and, when executing the instructions, to: receive, by the at least one processor, a message report from a user in response to an electronic message received by the user; identify, by the at least one processor, a confidence value associated with the user from whom the message report is received; add, by the at least one processor, if the confidence value exceeds a predetermined confidence value threshold, the confidence value to a signature value associated with the electronic message; determine, by the at least one processor, if the signature value exceeds a signature value threshold; and filter, by the at least one processor, the electronic message if the signature value exceeds the signature value threshold.

In one exemplary embodiment, the present disclosure is directed to a method for determining a level of confidence to associate with a message report, comprising: receiving, by a processor, a message report in response to an electronic message received by a user, the electronic message having an electronic signature; identifying, by the processor, a pre-existing confidence value associated with the user; associating, by the processor, the pre-existing confidence value with the received message report; calculating, by the processor, a response delay time corresponding to a first message report associated with the electronic signature; calculating, by the processor, a new confidence value using the calculated response delay time, the pre-existing confidence value, and a predetermined moderating value; associating, by the processor, the new confidence value with the user; and storing the new confidence value.

In another exemplary embodiment, the present disclosure is directed to a system for determining a level of confidence to associate with a message report, the system comprising: at least one memory to store data and instructions; and at least one processor configured to access the at least one memory and, when executing the instructions, to: receive, by the at least one processor, a message report in response to an electronic message received by a user, the electronic message having an electronic signature; identify, by the at least one processor, a pre-existing confidence value associated with the user; associate, by the at least one processor, the pre-existing confidence value with the received message report; calculate, by the at least one processor, a response delay time corresponding to a first message report associated with the electronic signature; calculate, by the at least one processor, a new confidence value using the calculated response delay time, the pre-existing confidence value, and a predetermined moderating value; associate, by the at least one processor, the new confidence value with the user; and store, in the at least one memory, the new confidence value.

DETAILED DESCRIPTION

Figure 1:
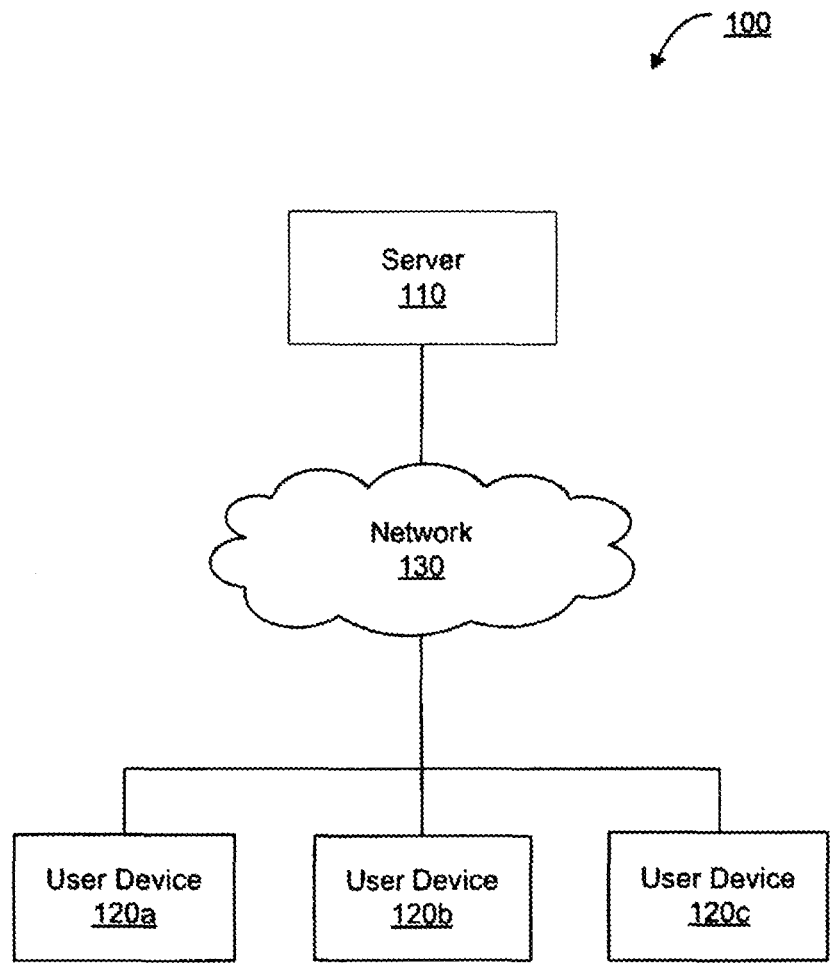
FIG. 1 is an exemplary communication system, consistent with certain disclosed embodiments.

FIG. 1 is a diagram of an exemplary communication system 100. Communication system 100 may be a spam-filtering system, and may be configured to identify and process spam and/or spam campaigns using one or more of the embodiments disclosed herein. A spam campaign may be, for example, a group of highly similar electronic messages (e.g., electronic mail messages, Short Messaging System (SMS) messages, Multimedia Messaging System (MMS) messages, etc.). Communication system 100 may be any type of communication system known in the art, including, for example, a wired communication system, a wireless communication system, or any combination thereof. As shown in FIG. 1, communication system 100 may include one or more servers 110, e.g., server 110, one or more user devices 120, e.g., user device 120a, user device 120b, and user device 120c, and network 130.

Figure 2:
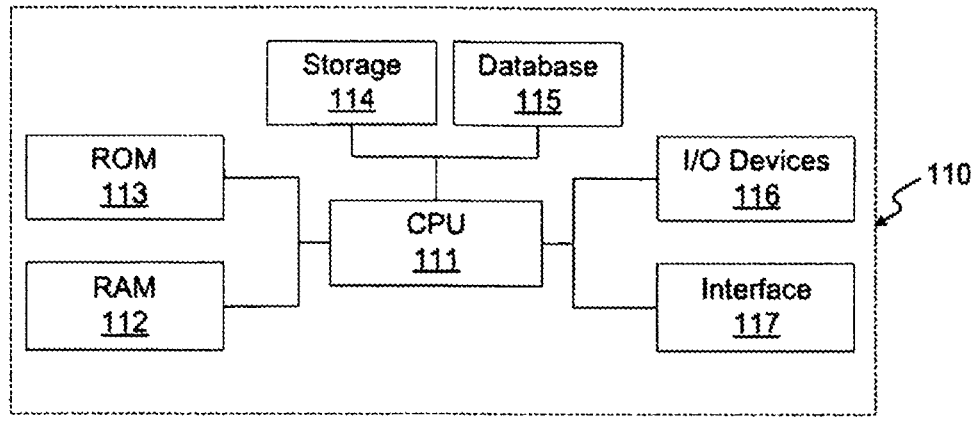
FIG. 2 is diagram of an exemplary server, consistent with certain disclosed embodiments.

FIG. 2 is a diagram of server 110, consistent with certain disclosed embodiments. As shown in FIG. 2, server 110 may include one or more hardware and/or software components such as, for example, central processing unit (CPU) 111, random access memory (RAM) module 112, read-only memory (ROM) module 113, storage 114, database 115, one or more input/output (I/O) devices 116, and interface 117.

Server 110 may be configured to receive, collect, analyze, evaluate, report, display, and distribute data related to filtering of electronic messages and/or determining a level of confidence associated with a user report, and may use one or more software components or applications accordingly. For example, server 110 may be configured to manage and track electronic messages, reports from users, system activity, patterns of messaging, information regarding system software, and the like, associated with the management, tracking, and collection of electronic messages, and to perform filtering of electronic messages and/or determine a level of confidence associated with a user report. Server 110 may be, for example, a mainframe, a server, a desktop, a laptop, and the like.

CPU 111 may include one or more processors, each configured to execute instructions and process data to perform functions associated with server 110. As illustrated in FIG. 2, CPU 111 may be connected to RAM 112, ROM 113, storage 114, database 115, I/O devices 116, and interface 117. CPU 111 may be configured to execute computer program instructions to perform various processes and methods consistent with certain disclosed embodiments. The computer program instructions may be loaded into RAM 112 for execution by CPU 111.

RAM 112 and ROM 113 may each include one or more devices for storing information associated with operation of server 110 and/or CPU 111. For example, ROM 113 may include a memory device configured to access and store information associated with server 110, including information for identifying, initializing, and monitoring the operation of one or more components and subsystems of server 110. RAM 112 may include a memory device for storing data associated with one or more operations performed by CPU 111. For example, instructions from ROM 113 may be loaded into RAM 112 for execution by CPU 111.

Storage 114 may include any type of storage device configured to store any type of information used by CPU 111 to perform one or more processes consistent with the disclosed embodiments. For example, storage 114 may include one or more magnetic and/or optical disk devices, such as hard drives, CD-ROMs, DVD-ROMs, or any other type of media storage device.

Database 115 may include one or more software and/or hardware components that store, organize, sort, filter, and/or arrange data used by server 110 and/or CPU 111. Database 115 may include a relational, distributed, or any other suitable database format. A relational database may be in tabular form where data may be organized and accessed in various ways. A distributed database may be dispersed or replicated among different locations within a communication network. For example, database 115 may store information such as electronic messages and/or data associated with the electronic messages, reports from users, system activity, patterns of messaging, information regarding system software, and the like, associated with the management, tracking, and collection of electronic messaging, or any other information that may be used by CPU 111 to perform filtering of electronic messages and/or determine a level of confidence associated with a user report. Database 115 may also include one or more analytical tools for analyzing information within the database. Database 115 may store additional and/or different information than that listed above.

I/O devices 116 may include one or more components configured to communicate information with a user associated with server 110. For example, I/O devices 116 may include a console with an integrated keyboard and mouse to allow a user to input parameters associated with server 110 and/or data associated with filtering of electronic messages and/or determining a level of confidence associated with a user report. I/O devices 116 may also include a user-accessible disk drive (e.g., a USB port, a floppy, CD-ROM, or DVD-ROM drive, etc.) to allow a user to input data stored on a portable media device. Additionally, I/O devices 116 may include one or more displays or other peripheral devices, such as, for example, a printer, a camera, a microphone, a speaker system, an electronic tablet, or any other suitable type of input/output device.

Interface 117 may include one or more components configured to transmit and receive data via network 130. In addition, interface 117 may include one or more modulators, demodulators, multiplexers, de-multiplexers, network communication devices, wireless devices, antennas, modems, and any other type of device configured to enable data communication via any suitable communication network. It is further anticipated that interface 117 may be configured to allow CPU 111, RAM 112, ROM 113, storage 114, database 115, and one or more I/O devices 116 to be located remotely from one another and to perform filtering of electronic messages and/or determine a level of confidence associated with a user report.

Server 110 may include additional, fewer, and/or different components than those listed above and it is understood that the listed components are exemplary only and not intended to be limiting. For example, one or more of the hardware components listed above may be implemented using software. For example, storage 114 may include a software partition associated with one or more other hardware components of server 110. Additional hardware or software may also be required to operate server 110, such as, for example, security applications, authentication systems, dedicated communication system, etc. The hardware and/or software may be interconnected and accessed as required by authorized users. As discussed above, server 110 may be in communication with network 130 by means of interface 117. Network 130 may be any appropriate communication network allowing communication between or among one or more entities, including, for example, server 110 and user devices 120a, 120b, and 120c. Network 130 may include, for example, the Internet, a local area network, a workstation peer-to-peer network, a direct link network, a wireless network, or any other suitable communication platform. Connection with network 130 may be wired, wireless, or any combination thereof.

Figure 3:
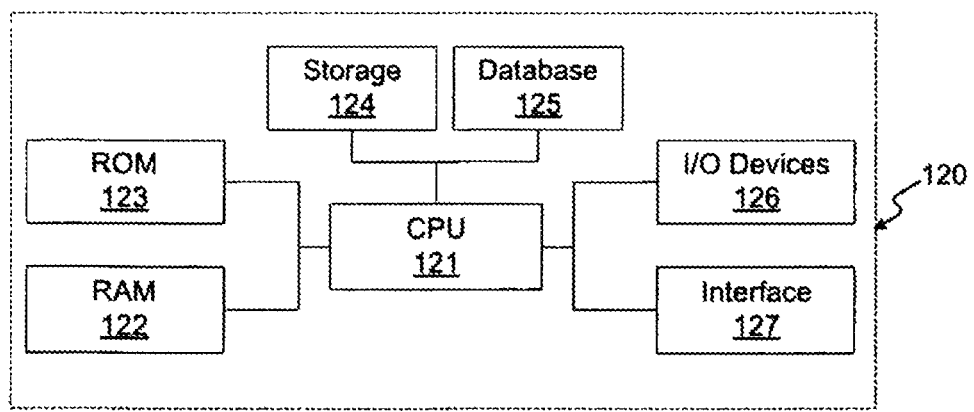
FIG. 3 is a diagram of an exemplary user device, consistent with certain disclosed embodiments.

FIG. 3 is a diagram of an exemplary user device 120, consistent with certain disclosed embodiments. As shown in FIG. 3, user device 120 may include one or more hardware and/or software components such as, for example, central processing unit (CPU) 121, random access memory (RAM) module 122, read-only memory (ROM) module 123, storage 124, database 125, one or more input/output (I/O) devices 126, and interface 127. User device 120 may be configured to receive, collect, analyze, evaluate, report, display, and distribute data related to filtering of electronic messages and/or determining a level of confidence associated with a user report, and may use one or more software components or applications accordingly. For example, user device 120 may be configured to send, receive, manage, and track electronic messages, transmit reports from users, transmit reports of system activity, and the like, associated with the management, tracking, and transmission of electronic messages, and to perform filtering of electronic messages and/or determine a level of confidence associated with a user report.

User device 120 may be any type of computing device configured to transmit and/or receive data to and/or from server 110 in communication system 100. User device 120 may include, for example, servers, clients, desktop computers, laptop computers, network computers, workstations, personal digital assistants (PDA), tablet PCs, scanners, telephony devices, pagers, cameras, musical devices, etc. In addition, user device 120 may include one or more wireless devices in a wireless communication network configured to communicate by means of centralized and/or distributed communication. In one exemplary embodiment, user device 120 may be a mobile computing device.

CPU 121 may include one or more processors, each configured to execute instructions and process data to perform functions associated with user device 120. As illustrated in FIG. 3, CPU 121 may be connected to RAM 122, ROM 123, storage 124, database 125, I/O devices 126, and interface 127. CPU 121 may be configured to execute computer program instructions to perform various processes and methods consistent with certain disclosed embodiments. The computer program instructions may be loaded into RAM 122 for execution by CPU 121.

RAM 122 and ROM 123 may each include one or more devices for storing information associated with operation of user device 120 and/or CPU 121. For example, ROM 123 may include a memory device configured to access and store information associated with user device 120, including information for identifying, initializing, and monitoring the operation of one or more components and subsystems of user device 120. RAM 122 may include a memory device for storing data associated with one or more operations performed by CPU 121. For example, instructions from ROM 123 may be loaded into RAM 122 for execution by CPU 121.

Storage 124 may include any type of storage device configured to store any type of information used by CPU 121 to perform one or more processes consistent with the disclosed embodiments. For example, storage 124 may include one or more magnetic and/or optical disk devices, such as hard drives, CD-ROMs, DVD-ROMs, or any other type of media storage device.

Database 125 may include one or more software and/or hardware components that store, organize, sort, filter, and/or arrange data used by user device 120 and/or CPU 121. Database 125 may include a relational, distributed, or any other suitable database format. A relational database may be in tabular form where data may be organized and accessed in various ways. A distributed database may be dispersed or replicated among different locations within a network. For example, database 125 may store information such as electronic messages and/or data associated with the electronic messages, reports from users, system activity, patterns of messaging, information regarding system software, and the like, associated with the management, tracking, and collection of electronic messaging, or any other information that may be used by CPU 121 to perform filtering of electronic messages and/or determine a level of confidence associated with a user report. Database 125 may also include one or more analytical tools for analyzing information within the database. Database 125 may store additional and/or different information than that listed above.

I/O devices 126 may include one or more components configured to communicate information with a user associated with user device 120. For example, I/O devices 126 may include a console with an integrated keyboard and mouse to allow a user to input parameters associated with user device 120 and/or data associated with filtering of electronic messages and/or determining a level of confidence associated with a user report. I/O devices 126 may also include a user-accessible disk drive (e.g., a USB port, a floppy, CD-ROM, or DVD-ROM drive, etc.) to allow a user to input data stored on a portable media device. Additionally, I/O devices 126 may include one or more displays or other peripheral devices, such as, for example, a printer, a camera, a microphone, a speaker system, an electronic tablet, or any other suitable type of input/output device.

Interface 127 may include one or more components configured to transmit and receive data via network 130. In addition, interface 127 may include one or more modulators, demodulators, multiplexers, de-multiplexers, network communication devices, wireless devices, antennas, modems, and any other type of device configured to enable data communication via any suitable communication network. It is further anticipated that interface 127 may be configured to allow CPU 121, RAM 122, ROM 123, storage 124, database 125, and one or more I/O devices 126 to be located remotely from one another and perform filtering of electronic messages and/or determining a level of confidence associated with a user report.

User device 120 may include additional, fewer, and/or different components than those listed above and it is understood that the listed components are exemplary only and not intended to be limiting. For example, one or more of the hardware components listed above may be implemented using software. For example, storage 124 may include a software partition associated with one or more other hardware components of user device 120. Additional hardware or software may also be required to operate user device 120, such as, for example, security applications, authentication systems, dedicated communication system, etc. The hardware and/or software may be interconnected and accessed as required by authorized users.

As discussed above in connection with FIG. 1, electronic messages may be decomposed into one or more signatures or fingerprints which may be used for identifying similar message (e.g., spam campaigns). Communication system 100 may be configured to process electronic messages based on a determination of similarity between a group of electronic messages (i.e., a signature) and a confidence value associated with a message report received from a user.

The similarity between members of a group of electronic messages may be calculated using any combination of techniques and/or algorithms. For example, the I-Match algorithm, a signature-based approach, may be used to cluster near-duplicate electronic messages by computing a single signature that is invariant over small changes in message content between a plurality of electronic messages. The I-Match algorithm computes a hash representation of an electronic message obtained based on a determination of an overlap between the electronic message contents and a specially constructed I-Match lexicon. Based on the results of the overlap determination, the I-Match algorithm assigns a signature to the electronic message. The I-Match algorithm is discussed in "Collection Statistics for Fast Duplicate Document Detection" (A. Chowdhury, O. Frieder, D. Grossman, and M. C. McCabe, ACM Transactions on Information Systems, 20(2):171-191, 2002).

In another embodiment, the I-Match algorithm may be enhanced by combining the results from K random perturbations of the I-Match lexicon, where K is a whole number, to increase the robustness of the signature-based approach. In some embodiments, further clusters of electronic messages may be generated by grouping messages that were assigned different signatures but have very similar content. For example, electronic messages that have a cosine similarity above some threshold may be grouped together to identify a spam campaign. Generally speaking, cosine similarity is a measure of similarity between two vectors of n dimensions obtained by finding the cosine of the angle between them. Cosine similarity is known in the art and will not be discussed herein further.

Using signature values, communication system 100 may be configured to perform the functions of: FilterSpam( ), to perform message processing, and UpgradeConfidence( ) and DowngradeConfidence( ), to determine a confidence value to associate with a message report.

Table 1 is pseudocode illustrating one exemplary embodiment in which communication system 100 performs the methods of the disclosed embodiments, including the methods of FilterSpam( ) UpgradeConfidence( ), and DowngradeConfidence( ), using a signature-based approach.

TABLE 1

Reporter-Based Reputation System for Spam Filtering

```
1: for each time period t do
2:   Set of signatures S = 0
3:   Set of users U = 0
4:   for each incoming TIS report {m, u} do
5:     FilterSpam(m, u)
6:   end for
7:   for each incoming TINS report {m, u} do
8:     DowngradeConfidence(t, m, u)
9:   end for
```

TABLE 1-continued

Reporter-Based Reputation System for Spam Filtering

10: UpgradeConfidence(t, S, U)
11: end for

In Table 1, t is a predetermined time period, S is a set of signatures associated with electronic messages observed during time period t, and U is a set of users from whom message reports are received during time period t. As used in Table 1, electronic messages may be email messages, and the message report may be a "this is spam" (TIS) report or a "this is not spam" (TINS) report. Thus, for example, when a user reports an email initially placed by the system in a legitimate-email folder (e.g., inbox folder) as spam, server 110 may receive the user report as a TIS report. Similarly, when a user reports an e-mail the system initially placed in the spam folder as non-spam, server 110 may receive the user report as a TINS report. Each message report (e.g., TIS report, TINS report, etc.) is identified by its receipt time, electronic message body/text m, and reporting user id u.

Figure 4:
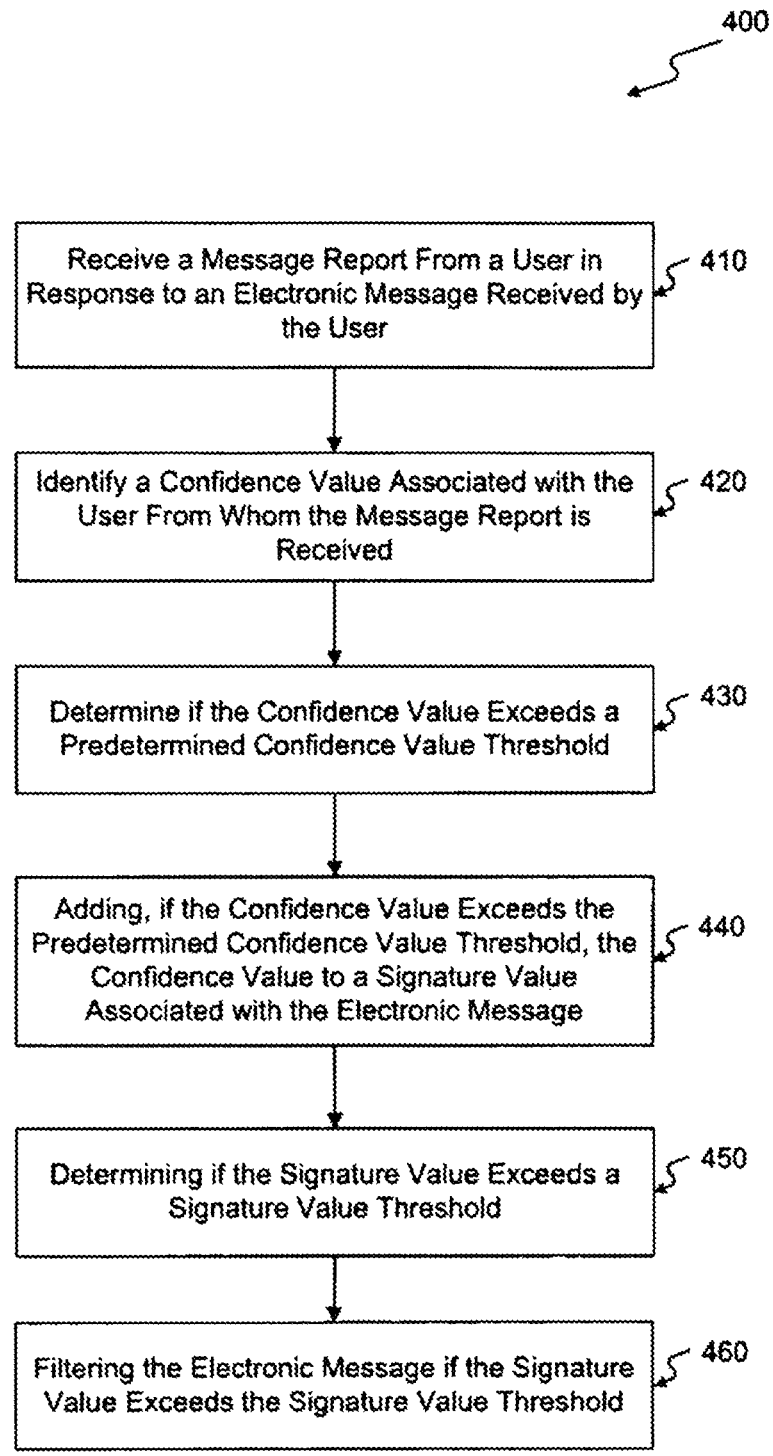
FIG. 4 is a flowchart illustrating an exemplary process for filtering messages, consistent with certain disclosed embodiments.

FIG. 4 is a flow chart illustrating a method 400 of filtering electronic messages, i.e., FilterSpam( ), in communication system 100, consistent with certain disclosed embodiments. Server 110 may be configured to receive a message report sent from a user in response to an electronic message received by the user (step 410). The electronic message may be, for example, an electronic mail (email) message, a Short Message System (SMS) message, a Multimedia Message System (MMS) message, an Instant Message (IM), etc. The message report may be an electronic message report initiated by a user via user device 120. In one exemplary embodiment, the electronic message may be an email message, and the message report initiated by the user may be a "this is spam" (TIS) report or a "this is not spam" (TINS) report, etc.

Server 110 may be configured to identify a confidence value associated with the user from whom the message report is received (step 420). In one exemplary embodiment, confidence values may range from 0 to 1, where a higher confidence value indicates a higher reliability that the message report will coincide with the message reports of other users having higher confidence values. Thus, for example, a user confidence value of 0 may indicate that either the user has not been recognized as "trustworthy" (i.e., having a high confidence value) by communication system 100 or has been recognized as "untrustworthy" (i.e., having a low confidence value) by communication system 100. Whereas a user confidence value of 1 may indicate that the user has been recognized as "trustworthy."

In some embodiments, the confidence value may be stored in storage 114 or database 115, and server 110 may be configured to access storage 114 or database 115 to retrieve the confidence value. In other embodiments, server 110 may calculate a confidence value for the user from which a message report is received, and store the calculated confidence value in storage 114 or database 115. In some embodiments, the confidence value may be recalculated upon receipt of each subsequent message report from the user.

In one exemplary embodiment, a confidence value may be calculated for only a subset of users from which message reports are received. In some embodiments, server 110 may be configured to pick a random subset of a group including a first set of reporters. In other exemplary embodiments, a confidence value may be calculated for a subset of users who have reported the electronic message as spam within a specified time window after its first appearance. Calculating a confidence value may include calculating an upgraded confidence value, i.e., UpgradeConfidence( ), or calculating a downgraded confidence value, i.e., DowngradeConfidence ( ).

Equation 1 is an exemplary algorithm for calculating an upgraded confidence value, UpgradeConfidence( ), where the confidence value for a user u at time t is confidence(u, t). As shown by Equation 1, the degree to which a positive experience increases the confidence value of a user is described as $\alpha$ which is a number between 0 and 1. The number is large when communication system 100 is configured to build confidence in its users easily, and small otherwise. In some embodiments, a user can be rewarded only once in a given time period.

$$\text{confidence}(u,t) = \text{confidence}(u,t-1) + \alpha \cdot (1 - \text{confidence}(u,t-1)) \quad \text{Equation 1}$$

Equation 2 is an exemplary algorithm for calculating a downgraded confidence value, DowngradeConfidence( ). The confidence value downgrade function may be used, for example, to calculate a new confidence value when a user reports an email as non-spam but the community has identified it as spam, such that confidence in the user may diminish. A user's confidence value may be downgraded as many times as the user submits such a report to ensure that communication system 100 is able to make a timely response to users who begin behaving suspiciously. The degree to which a negative experience (i.e., an incorrect report) lowers the confidence value of a user is described as $\beta$ and is also a number between 0 and 1. In contrast to the confidence value upgrade function, in the confidence value downgrade function, in certain embodiments, a user may be penalized more than once in any given time period The confidence value downgrade function is:

$$\text{confidence}(u,t) = \text{confidence}(u,t-1) - \beta \cdot (1 - \text{confidence}(u,t-1)) \quad \text{Equation 2}$$

As used in Equations 1 and 2, the values of $\alpha$ and $\beta$ may be optimized by picking a validation set of report data, and running the system with different values of $\alpha$ and $\beta$ to see which values may allow the reliable user set to grow to a desired size and maintain a steady spam coverage over time. In some embodiments, the values of $\alpha$ and $\beta$ may be set to the values resulting from the validation set. In other embodiments, the values of $\alpha$ and $\beta$ may be changed over time to reflect changing user-pool dynamics.

In alternative embodiments, the confidence value may be calculated by giving greater weight to more recent experiences. That is, only the most recent confidence value is taken into account, and the previous confidence values are considered only implicitly. Thus, in the confidence value upgrade function, there may be no reference to the results of previous steps and no indication as to whether the user has been continuously upgraded or downgraded until time t. The confidence value calculation gives weight only to the most recent experience.

Equation 3 is another exemplary algorithm for calculating an upgraded confidence value, UpgradeConfidence( ). In Equation 3, equal weight is given to k number of most recent experiences. The confidence value upgrade function is:

$$\text{confidence}(u, t) = \text{confidence}(u, t-1) + \alpha \cdot \left(1 - \frac{\sum_{i=1}^{k} \text{confidence}(u, t-i)}{k}\right) \quad \text{Equation 3}$$

Equation 4 is an exemplary algorithm for calculating a downgraded confidence value, DowngradeConfidence( ). In Equation 4, equal weight is given to k number of most recent experiences. The confidence value downgrade function is:

$$\text{confidence}(u, t) = \text{confidence}(u, t-1) - \beta \cdot \left(1 - \frac{\sum_{i=1}^{k} \text{confidence}(u, t-i)}{k}\right) \quad \text{Equation 4}$$

Depending on the desired characteristics of the change in a user's confidence value over time, alternative confidence value functions may be used, such as, for example, upgrading the confidence value and downgrading the confidence value by a constant, or by functions that give different weights to a certain number of recent experiences, etc.

Once a confidence value associated with the user is determined, server 110 may determine if the identified confidence value exceeds a predetermined confidence value threshold $\theta_{confidence}$ (step 430). The confidence value threshold $\theta_{confidence}$ may be, for example, a constant value, an algorithm, etc. In one exemplary embodiment, users with scores above the confidence value threshold $\theta_{confidence}$ are considered trustworthy users.

In some exemplary embodiments, the confidence value threshold $\theta_{confidence}$ may be derived from the values of user $\alpha$ and user $\beta$, and a system vulnerability value X. For example, using the confidence upgrade function, Equation 1, the confidence value calculated for a user who is upgraded every day for X days (and has not been downgraded) is shown in Equation 5:

$$\text{confidence}(u, t+X) = \sum_{j=0}^{X-1} \alpha \cdot (1-\alpha)^j + (1-\alpha)^X \cdot \text{confidence}(u, t) \quad \text{Equation 5}$$

If the user is new to the system, the initial confidence value confidence(u,0) is equal to 0. Thus, as shown in Equation 6, if the set of trustworthy users has a minimum confidence value threshold of $\theta_{confidence}$ then the minimum number of days X needed to join the set of trustworthy users, and the least number of days until a user can affect the system, is:

$$X \geq \log(1-\alpha)^{1-\theta_{confidence}} \quad \text{Equation 6}$$

In some embodiments, there may be a plurality of confidence value thresholds $\theta_{confidence}$, and different actions may be taken when the user confidence value exceeds any one or more of the plurality of confidence value thresholds $\theta_{confidence}$. For example, as a user's confidence value increases, a greater weight may be given to the user's confidence value, and this greater weight may be calculated based on a number of confidence value thresholds $\theta_{confidence}$ exceeded, or a relative value of confidence value thresholds $\theta_{confidence}$ exceeded. Thus, the higher the confidence value threshold $\theta_{confidence}$, the greater the weight given to the user's confidence value.

If it is determined that the confidence value exceeds the predetermined confidence value threshold, i.e., the message report was received from a trustworthy user, the confidence value is added to a signature value associated with the electronic message (step 440). The signature value may be a value that is maintained for electronic messages having a same signature to track and identify spam campaigns. That is, for electronic message having a same or highly similar signature, a signature value may be maintained and used to signal that electronic messages with that signature are either spam or not spam. Thus, an incoming electronic message m may be labeled as "spam" or "non-spam", based on the reports of trustworthy users.

Equation 7 is an exemplary equation for calculating a signature value. As shown in Equation 7, assuming a fixed time window t for an electronic message m, sig(m) may be used to denote the signature of the electronic message, where confidence($u_i$) is the current confidence value associated with trusted user $u_i$, i.e., a user with a confidence value higher than an established threshold. For any set M of messages with the same signature, i.e., $\alpha m_i$, $m_j \in M$, sig($m_i$)= sig($m_j$), reporters(sig(m)) may be used to denote the set of users who have reported any message m$\in$M as spam. Thus, the signature value, score(sig(m)), for an electronic message m$\in$M may be computed as shown in Equation 7.

$$\text{score}(sig(m)) = \sum_{u_i \in reporters(sig(m))} \text{confidence}(u_i) \quad \text{Equation 7}$$

In some embodiments, messages m may be labeled as "spam" if score(sig(m)) is above a signature value threshold $\theta_{spam}$. The signature value threshold may be selected in different ways. For example, the signature value threshold may be a fixed number, based on a minimum number of reporters, i.e., users sending message reports, having a minimum confidence value. Alternatively, the signature value threshold may vary as a percentage of the number of trustworthy users N, where trustworthy means a user with a confidence value above a designated confidence value threshold $\theta_{confidence}$.

In one exemplary embodiment, the signature value threshold $\theta_{spam}$ may be calculated based on the confidence value threshold $\theta_{confidence}$ and a value corresponding to the least number of user accounts Y a malicious user needs to affect the decision of communication system 100 regarding a particular message signature. As shown in Equation 8, if a malicious user wants to affect communication system 100 after the malicious user joins the trustworthy user set, then the user needs to report a message from Y accounts such that the spam score of the message rises above the spam threshold $\theta_{spam}$:

$$\sum_{i=1}^{m} \text{confidence}(i,t) \geq Y^* \theta_{confidence} \geq \theta_{spam}. \quad \text{Equation 8}$$

Therefore, as shown in Equation 9, the signature value threshold $\theta_{spam}$ can be derived based on the confidence value threshold $\theta_{confidence}$ and a determination of the least number of accounts Y:

$$Y \geq \frac{\theta_{spam}}{\theta_{confidence}} \quad \text{Equation 9}$$

In some embodiments, there may be a plurality of signature value thresholds $\theta_{spam}$, and different actions may be taken when the signature value exceeds any one or more of the plurality of signature value thresholds $\theta_{spam}$. For example, as a signature value increases, a greater weight may be given to the signature value, and this greater weight may be calculated based on a number of signature value thresholds $\theta_{spam}$ exceeded, or a relative value of signature value thresholds $\theta_{spam}$ exceeded. Thus, the higher the signature value threshold $\theta_{spam}$, the greater the weight given to the signature value. In another embodiment, electronic messages may be categorized into different categories of message types based on a number of signature value thresholds $\theta_{spam}$ exceeded, or a relative value of signature value thresholds $\theta_{spam}$ exceeded. For example, when a first signature value threshold $\theta_{spam}$ is exceeded, server 110 may categorize an electronic message as "spam—not to be deleted," but when a second signature value threshold $\theta_{spam}$ is exceeded, server 110 may categorize the electronic message as "spam—to be deleted." Similarly, when the signature value remains below the signature value threshold $\theta_{spam}$, server 110 may categorize an electronic message as "not spam."

If the signature value exceeds the signature value threshold, server 110 may filter the electronic message (step 460). Table 2 is pseudocode illustrating one exemplary embodiment of spam filtering.

TABLE 2

Reporter-based Reputation System Spam-Filtering Algorithm

```
FilterSpam(m,u)
1: if (u ∉ U ) then
2:      U = U ∪ u
3: end if
4: s = sig(m)
5: if (confidence(u) > θ_confidence) then
6:      if ( s ∉ S ) then
7:              S = S ∪ s
8:              spam(s) = false
9:              score(s) = 0
10:             reporters(s) = N
11: end if
12: if (spam(s) == false) then
13:             reporters(s) = reporters(s) χ u
14:             score(s)+ = confidence(u)
15:             if (score(s) > θ_spam) then
16:                 spam(s) = true
17:         end if
18:     end if
19: end if
```

As shown in Table 2, each message report is identified by its receipt time t, electronic message body/text m, and reporting user id u. U is a set of users reporting during a specified time period, and S is a set of signatures observed during that time period. The time window t in the confidence-maintenance algorithm is to ensure that a user is not rewarded more than once in the given time window, so that a high confidence value is not assigned in a too-short period of time. The time window does not need to correspond to the time window in the spam filtering algorithm.

Figure 5:
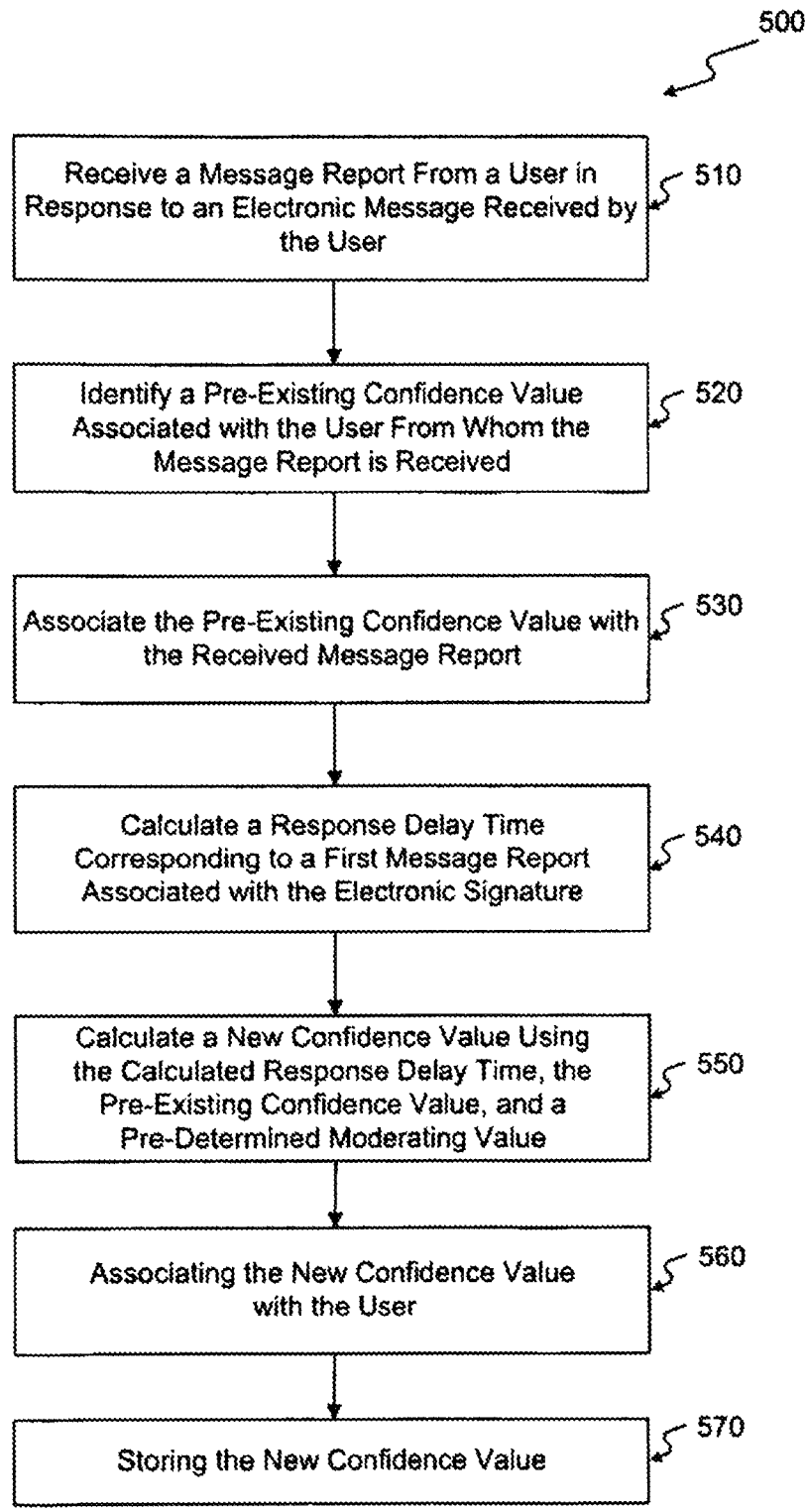
FIG. 5 is a flowchart illustrating an exemplary process for determining a level of confidence associated with a user, consistent with certain disclosed embodiments.

FIG. 5 is a flow chart illustrating the method 500 of filtering electronic messages in communication system 100, consistent with certain disclosed embodiments. Similarly to step 410 of FIG. 4, server 110 may be configured to receive a message report from a user in response to an electronic message received by the user (step 510). The message report may be an electronic message report initiated by a user via user device 120.

After receiving the message report, server 110 may identify a pre-existing confidence value associated with the user from whom the message report is received (step 520). In some embodiments, the pre-existing confidence value may be a confidence value which was previously calculated for the user, and stored in storage 114 or database 115. As discussed above in step 420, in one exemplary embodiment, confidence values may range from 0 to 1, where a higher confidence value indicates a higher reliability that the message report will coincide with the message reports of the users having highest confidence values. Thus, for example, a user confidence value of 0 may indicate that either the user has not been recognized as "trustworthy," i.e., having a high confidence value, by system 100 or has been recognized as "untrustworthy," i.e., having a low confidence value, by system 100.

Server 110 may be configured to associate the pre-existing confidence value with the received message report (step 530). In some embodiments, server 110 may access storage 114 or database 115 to retrieve a previously stored confidence value, and may associate the stored confidence value with the received message report. In some exemplary embodiments, the pre-existing confidence value may have been calculated according to any of the method or equations disclosed in connection with FIG. 4, including Equations 1-7.

Server 110 may be configured to calculate a response delay time corresponding to a first message report associated with the electronic signature (step 540). As discussed above, an electronic message signature may be a numerical representation of an electronic message, where a large number of electronic messages having the same or highly similar message signatures may be considered to be a spam campaign. Communication system 100 may provide an indication of the time when a first message report associated with an electronic message signature is received by server 110. The first message report time may be, for example, the time when a first user indicates that an electronic message having a particular electronic signature may be spam, or the time server 110 receives the message report indicating that an electronic message having a particular electronic signature may be spam, etc. The first message report time may be a time set by communication system 100, server 110, or user device 120. In one exemplary embodiment, the first message report time is the time at which server 110 receives the message report indicating that an electronic message having a particular electronic signature is spam, and the response delay time is the difference between the first message report time and the time at which server 110 receives the message report from the user, as discussed above in connection with step 510.

Once a response delay time has been calculated, server 110 may calculate a new confidence value using the calculated response delay time, the pre-existing confidence value, and a predetermined moderating value (step 550). Similarly to step 420 of FIG. 4, calculating a confidence value may include calculating an upgraded confidence value, UpgradeConfidence( ) or calculating a downgraded confidence value, DowngradeConfidence( ). In some embodiments, the new confidence value may be calculated according to any of the methods or equations disclosed above in connection with FIG. 4.

Server 110 may associate the new confidence value with the user (step 560), and server 110 may store the new confidence value in storage 114 or database 115 (step 570). In some embodiments, an index or the like may be used to associate the new confidence value with the user. The new confidence value may be used by communication system 100 to perform the method disclosed in FIG. 4 or FIG. 5.

In this manner, the apparatuses and methods disclosed may be configured to perform filtering of electronic messages to reduce spam and/or spam campaigns. In addition, the apparatuses and methods disclosed herein may be configured to determine a level of confidence to associate with a user report to improve the reliability of a spam filtering system, which, in turn, improves performance and reduces costs.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A method for electronic messaging, the method comprising the following operations performed by at least one processor:
   receiving an electronic message including an electronic signature;
   calculating a response delay time corresponding to the electronic signature;
   calculating a confidence value to associate with a user based on the calculated response delay time and a predetermined moderating value; and
   storing, in a memory device, the confidence value and its association with a user.

2. The method of claim 1, further comprising:
   comparing the confidence value to a predetermined confidence value threshold.

3. The method of claim 2, further comprising:
   aggregating, if the confidence value exceeds a predetermined confidence value threshold, the confidence value to a signature value associated with the electronic message.

4. The method of claim 3, further comprising:
   analyzing if the signature value exceeds a signature value threshold; and
   segregating the electronic message if the signature value exceeds the signature value threshold.

5. The method of claim 4, wherein the signature value threshold includes a plurality of signature value thresholds, and analyzing if the signature value exceeds the signature value threshold further comprises:
   analyzing if the signature value exceeds at least one of the plurality of signature value thresholds;
   analyzing a category of message type to associate with the electronic message based on the at least one of the plurality of signature value thresholds exceeded by the signature value; and
   segregating the electronic message based on the category of message type.

6. The method of claim 5, further comprising:
   analyzing a category of message type including the at least one of the plurality of signature value thresholds exceeded by a cosine similarity value.

7. The method of claim 5, wherein the category of message type is at least one of spam and not spam.

8. The method of claim 1, wherein the electronic message includes one or more of an electronic mail (email) message, a Short Message Service (SMS) message, a Multimedia Messaging Service (MMS) message, and an Instant Message (IM).

9. The method of claim 1, further comprising:
   receiving a message report from the user in response to the electronic message received by the user.

10. The method of claim 9, further comprising:
    recalculating the confidence value upon receiving subsequent message reports from the user.

11. A system for electronic messaging, the system comprising:
    at least one memory device to store data and instructions; and
    at least one processor configured to access the at least one memory device and, when executing the instructions, to:
      receive an electronic message including an electronic signature;
      calculate a response delay time corresponding to the electronic signature;
      calculate a confidence value to associate with a user based on the calculated response delay time and a predetermined moderating value; and
      store the confidence value and its association with a user.

12. The system of claim 11, wherein the at least one processor is further configured to:
    compare the confidence value to a predetermined confidence value threshold.

13. The system of claim 12, wherein the at least one processor is further configured to:
    aggregate, if the confidence value exceeds a predetermined confidence value threshold, the confidence value to a signature value associated with the electronic message.

14. The system of claim 13, wherein the at least one processor is further configured to:
    analyze if the signature value exceeds a signature value threshold; and
    segregate the electronic message if the signature value exceeds the signature value threshold.

15. The system of claim 14, wherein the signature value threshold includes a plurality of signature value thresholds, and wherein the at least one processor is configured to analyze if the electronic signature value exceeds the electronic signature value threshold, and wherein the at least one processor is further configured to:
    analyze if the signature value exceeds at least one of the plurality of signature value thresholds;
    analyze a category of message type to associate with the electronic message based on the at least one of the plurality of signature value thresholds exceeded by the signature value; and
    segregate the electronic message based on the category of message type.

16. The system of claim 15, wherein the at least one processor is further configured to:
    analyze a category of message type including the at least one of the plurality of signature value thresholds exceeded by a cosine similarity value.

17. The system of claim 15, wherein the category of message type is at least one of spam and not spam.

18. The system of claim 11, wherein the electronic message includes one or more of an electronic mail (email) message, a Short Message Service (SMS) message, a Multimedia Messaging Service (MMS) message, and an Instant Message (IM).

19. The system of claim 11, wherein the at least one processor is further configured to:

receive a message report from the user in response to the electronic message received by the user.

20. The system of claim 19, wherein the at least one processor is further configured to:

recalculate the confidence value upon receiving subsequent message reports from the user.

* * * * *